O. B. JUDD.
REAPING AND MOWING MACHINE.
No. 12,252. Patented Jan. 16, 1855.
Fig. 1.
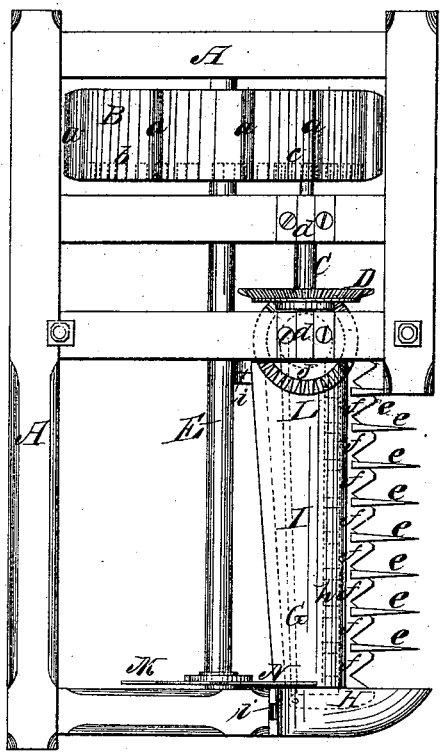
Fig. 2.
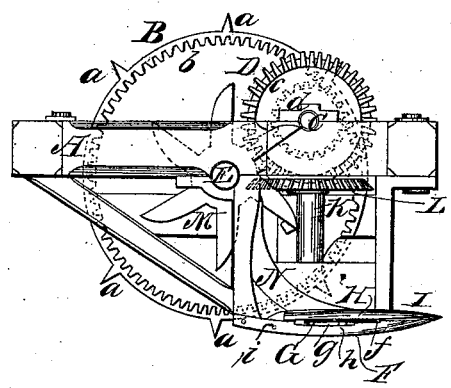
Fig. 3.
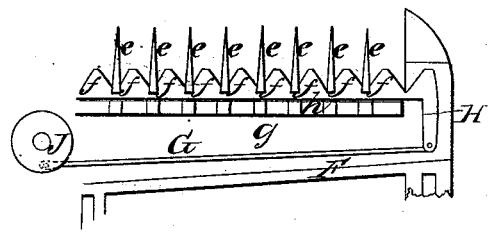
Fig. 4.

UNITED STATES PATENT OFFICE.

O. B. JUDD, OF LITTLE FALLS, NEW YORK.

IMPROVEMENT IN GRAIN AND GRASS HARVESTERS

Specification forming part of Letters Patent No. 12,252, dated January 16, 1855.

*To all whom it may concern:*

Be it known that I, O. B. JUDD, of Little Falls, in the county of Herkimer and State of New York, have invented certain new and useful Improvements in Mowing and Reaping Machines; and I do hereby declare that the following is a full, clear, and exact description of the same, reference being had to the annexed drawings, making a part of this specification, in which—

Figure 1 is a plan or top view of my improved machine. Fig. 2 is an end view of the same. Fig. 3 is a detached plan or top view of the finger-bar, the sickle-bar, which is hinged to the finger-bar, being removed. Fig. 4 is a detached end view of the finger and sickle bars.

Similar letters of reference indicate corresponding parts in the several figures.

This invention relates to certain new and useful improvements in mowing and reaping machines; and it consists, first, in the employment or use of cutters or shears placed at one end of the frame of the machine and arranged, as will be hereinafter shown, for the purpose of cutting the grass or grain that may overlap or become entangled at the inner edge of the swath, and thereby causing a smooth and even edge to be cut, so that no standing grass or grain will be left as the machine cuts the succeeding or adjoining swath.

My invention consists, second, in a peculiar construction and arrangement of the finger and sickle bars, whereby the sickle is properly secured in its proper place, and may also be detached and adjusted to the machine with the greatest facility.

My invention consists, third, in a peculiar mode of connecting or attaching the connecting-rod to the sickle, as will be hereinafter shown, by which a long connecting-rod may be used, and at the same time the machine rendered very compact.

To enable others skilled in the art to fully understand and construct my invention, I will proceed to describe it.

A, Figs. 1 and 2, is the framing, constructed in any proper manner; and B is the driving-wheel, provided, as usual, with projections $a$ on its periphery to prevent the slipping of the same. The wheel B has cogs $b$ on its inner periphery, in which a pinion, $c$, gears, (see dotted lines, Figs. 1 and 2,) the pinion $c$ being at one end of a small shaft, C, which has at its opposite end a beveled toothed wheel, D, the shaft C running in suitable bearings, $d$, on the framing A. The axis of the driving-wheel (represented by E) extends wholly across the framing, as shown in Fig. 1.

F is the finger-bar, attached to the front end of the framing A and at its lower part, and $e$ are the fingers, attached to the front edge of said bar. (See Figs. 1, 3, and 4.) The inner edges of the fingers $e$ are provided with slots or recesses, as usual, for the reception of the sickle-teeth $f$. (See Fig. 4.) The finger-bar F has a cavity or recess, $g$, in its upper surface, extending its whole length, in which cavity or recess the connecting rod G is placed, the outer end of the connecting-rod being attached to the outer end of the sickle H, as clearly shown in Fig. 3. The teeth $f$ of the sickle work in the slots or recesses in the fingers, and the back part of the sickle rests upon the finger-bar F, its back edge being against a ledge, $h$, on the upper surface of the finger-bar.

I is the sickle-bar, which is attached by hinges $i\ i$ to the back edge of the finger-bar F. The front edge of the sickle-bar I, when down, rests upon the back part of the sickle H and keeps it in its proper place, and also the connecting-rod G. The sickle-bar may be kept down by its own gravity; or, if necessary, any suitable catch or fastening may be employed. The inner end of the connecting-rod G is attached to a crank-pulley, J, which is at the lower end of a vertical shaft, K, having upon its upper end a bevel-wheel, L, which gears into the bevel-wheel D.

The axis E of the driving-wheel B has upon its outer end, or the end opposite to where the wheel B is attached, a series of radial cutters, M, which, as the axis E rotates, pass over the edge of a stationary cutter, N, secured to the outer end of the sickle-bar I, as shown in Figs. 1 and 2.

It will be seen that the rotating cutters M and stationary cutter N will cut all grass or grain that may overlap or be entangled in the line of their path, and consequently a clean, straight edge will be left on the side of the swath, so that as the machine passes along, cutting a succeeding swath, no grain or grass will be left standing.

By attaching the connecting-rod G to the outer end of the sickle H a long and straight rod is obtained, no bend or curve in the rod being required, as is the case in the present machines in use.

By having the sickle-bar attached by hinges to the finger-bar, as shown, both the sickle and connecting bar are kept properly in place, and by raising the sickle-bar the sickle may be readily detached from the machine and attached to it.

Having thus described my invention, what I claim as new, and desire to secure by Letters Patent, is—

1. The employment or use of the rotating cutters M and stationary cutter N, arranged substantially as herein shown, and for the purpose as set forth.

2. Attaching the connecting-rod G to the outer end of the sickle H, as shown, for the purpose of being enabled to employ a long straight rod with a compact machine.

3. Attaching the sickle-bar I to the finger-bar F by hinges, as shown, whereby the sickle and connecting-rod are kept properly in place and the sickle readily attached to and detached from the machine, as described.

O. B. JUDD.

Witnesses:
   I. G. MASON,
   I. W. COOMBS.